United States Patent [19]

Lord

[11] 4,299,496
[45] Nov. 10, 1981

[54] LOAD PROXIMITY DETECTION TECHNIQUES

[75] Inventor: John J. Lord, Pontiac, Ill.

[73] Assignee: Interlake, Inc., Oak Brook, Ill.

[21] Appl. No.: 958,042

[22] Filed: Nov. 6, 1978

[51] Int. Cl.$^3$ ............... B65G 43/00; G01S 17/08
[52] U.S. Cl. ........................ 356/446; 250/224;
250/561; 340/524; 340/686; 356/447; 414/274
[58] Field of Search ......... 356/373, 375, 51, 445–448,
356/256, 72; 250/224, 561, 562, 340, 341;
340/555, 556, 557, 619, 51, 52 R, 524, 686;
414/274, 275, 281

[56] References Cited

U.S. PATENT DOCUMENTS

| | | | |
|---|---|---|---|
| 2,074,251 | 3/1937 | Braun | 180/79.1 |
| 3,417,879 | 12/1968 | Gough | 214/16 |
| 3,450,887 | 6/1969 | Nirenberg | 250/219 |
| 3,458,060 | 7/1969 | Mary | 214/16.4 |
| 3,557,973 | 1/1971 | Bussienne et al. | 214/16 |
| 3,557,974 | 1/1971 | Ostrander | 414/274 |
| 3,563,327 | 2/1971 | Mier | 180/65 |
| 3,612,206 | 12/1971 | Ohntrup | 180/98 |
| 3,642,087 | 2/1972 | Sampey | 180/98 |
| 3,664,701 | 5/1972 | Kondur | 293/4 |
| 3,667,564 | 6/1972 | Schnell | 180/79.1 |
| 3,708,668 | 1/1972 | Tilley | 180/98 X |
| 3,718,201 | 2/1973 | Schleupen et al. | 180/98 |
| 3,738,443 | 6/1973 | Kubo | 180/98 |
| 3,738,506 | 6/1973 | Cornford et al. | 214/16.4 |
| 3,749,923 | 7/1973 | Husome | 250/223 |
| 3,812,929 | 5/1974 | Farqué | 180/98 |
| 3,906,232 | 9/1975 | Meihofer | 250/341 |
| 3,958,102 | 5/1976 | Burt | 214/16.4 X |
| 3,973,685 | 8/1976 | Loomer | 250/223 R X |
| 4,068,222 | 1/1978 | Treviranus | 340/556 |
| 4,207,466 | 6/1980 | Drage et al. | 340/556 X |

Primary Examiner—John K. Corbin
Assistant Examiner—Bruce Y. Arnold
Attorney, Agent, or Firm—Allegretti, Newitt, Witcoff & McAndrews

[57] ABSTRACT

A storage rack entry vehicle for transporting loads in a warehousing system includes infrared radiation source and detector units which determine the relative position of the vehicle and load. The optical axes of the source and detector are parallel and closely-spaced. When infrared radiation from the source is scattered by the load (or a pallet carrying the load), some of the radiation is reflected back to the detector along a path substantially parallel to the optical axes. The maximum range of detection is controlled by adjusting the gain of an amplifier which forms part of the detector.

7 Claims, 8 Drawing Figures

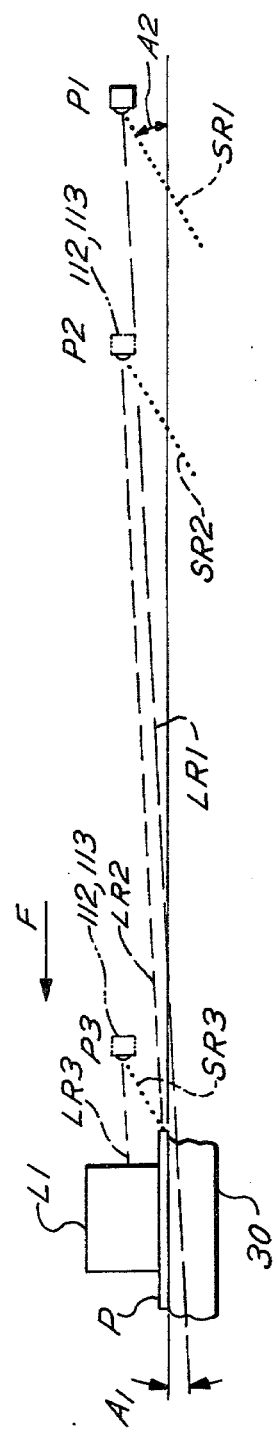
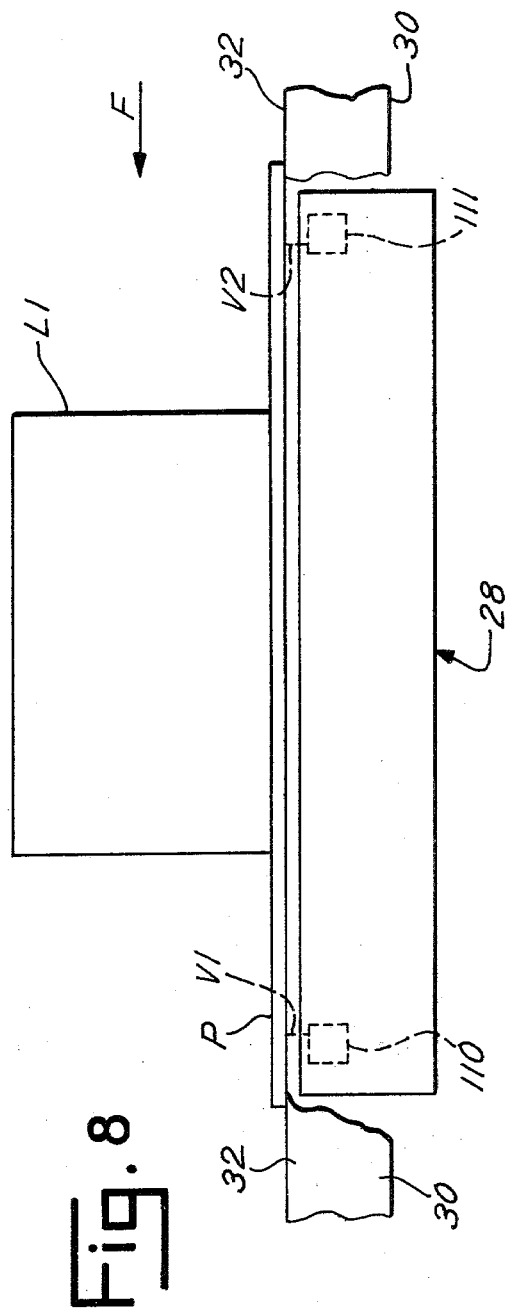

LOAD PROXIMITY DETECTION TECHNIQUES

BACKGROUND AND SUMMARY OF THE INVENTION

This invention relates to a vehicle for transporting loads and, more particularly, to an improved article storage and retrieval storage rack entry vehicle capable of detecting the proximity of loads to the vehicle.

A variety of systems have been employed in the past for the storage and retrieval of articles in high volume warehouses. One such system comprises a plurality of storage racks separated from each other by aisles. The disadvantage of such a system is that the density of storage for a storage space of given cubic volume is reduced because of the large number of aisles that must be provided for the operation of a storage and retrieval vehicle.

In order to minimize this loss of storage density, various high density storage systems have been devised in which the number of aisles per cubic volume of storage space has been substantially reduced and replaced by storage structures. In one such horizontal bin system, a rack entry vehicle is employed which moves into elongate bins in the rack to either store an article in a bin at a designated location or to retrieve a designated article from a bin. It is this latter form of high density storage system with which the present invention is concerned.

Rack entry vehicles in such high density systems are subject to several potential problems. For example, the loads which such vehicles must handle are frequently of substantial weight, sometimes as much as 2–3 tons. Even though the loads handled by the rack entry vehicles are frequently palletized, the loads still may be distributed unevenly. Compounding this problem is the fact that the storage racks in such systems are frequently many stories in height and are of substantial length and width. In such an environment, it is important for the vehicle to accurately detect its proximity to the palletized loads. If a load is not properly positioned on the vehicle, or if the vehicle rams a load resting on the rack, the load could tumble through the rack structure, thereby damaging other loads or causing them to fall.

Devices for determining the presence of a palletized load above a rack entry vehicle have been developed in the past. One such system is shown in U.S. Pat. No. 3,973,685 (Loomer—Aug. 10, 1976.) Loomer uses a visible light transmitter which projects a continuous light beam along a first axis and a visible light receiver which receives a reflected light beam along a second axis. The transmitter and receiver are angularly-oriented to enable the first and second axes to intersect at a junction located in the plane of the pallet to be sensed. Experience has shown that the Loomer system has defects which limit its usefulness. For example, the Loomer receiver is subject to errors because of its sensitivity to ambient light. It is also subject to errors in the event that a relatively small target is sensed. Since the light beam axes intersect in only one plane, it is possible for the vehicle to pass through that plane before the receiver can detect the presence of the target.

The applicant has discovered that a load proximity detector diametrically opposed to the device described by Loomer improves the accuracy and reliability with which the position of loads can be detected. A preferred form of the present invention includes a radiation source which projects optical radiation along a first axis and a detector for receiving optical radiation along a second axis. The first and second axes are parallel, and this feature enables radiation to be received continuously from a pallet or load as soon as the receiver is within a predetermined range. The range is adjustable by varying the intensity of the radiation, the sensitivity of the detector, or the angle at which the radiation strikes the object being detected. As used in this specification and these claims, optical radiation means electromagnetic radiation within the infrared, visible and ultraviolet bands of the spectrum from about $10^{-3}$ to about $10^{-8}$ meters in wavelength.

According to other aspects of the present invention, the radiation lies within the infrared portion of the electromagnetic spectrum, and the transmitter is pulsed or cycled. These features make the invention immune from ambient light conditions. By use of the foregoing features, small loads or pallets can be detected with a degree of accuracy and reliability previously unattainable.

These and other features and advantages of the present invention will be more clearly understood through a consideration of the following detailed description.

BRIEF DESCRIPTION OF THE DRAWINGS

In the course of this description, reference will be made to the attached drawings in which:

FIG. 7 is a schematic drawing illustrating the manner in which the proximity of a palletized load is detected as the entry vehicle approaches the load; and FIG. 8 is a schematic side elevational view illustrating how the presence of a load above the entry vehicle is detected.

DESCRIPTION OF THE PREFERRED EMBODIMENT

A perspective partial view of a high density warehousing system is shown of the kind in which a rack entry vehicle incorporating the principles of the present invention may be employed. The high density storage system includes at least one article storage rack structure, generally 10, having a plurality of elongate, generally horizontal storage bins 12–15 on top of and alongside of each other in the rack structure. Each of the bins 12–15 opens to the open front 16 of the storage rack 10. The open front 16 of the rack faces a longitudinal aisle 18 extending across the face of the rack 10. Although not shown, it will be understood that the warehousing system may include additional racks and bins similar to rack 10 and may include more than one aisle.

Figure 1:
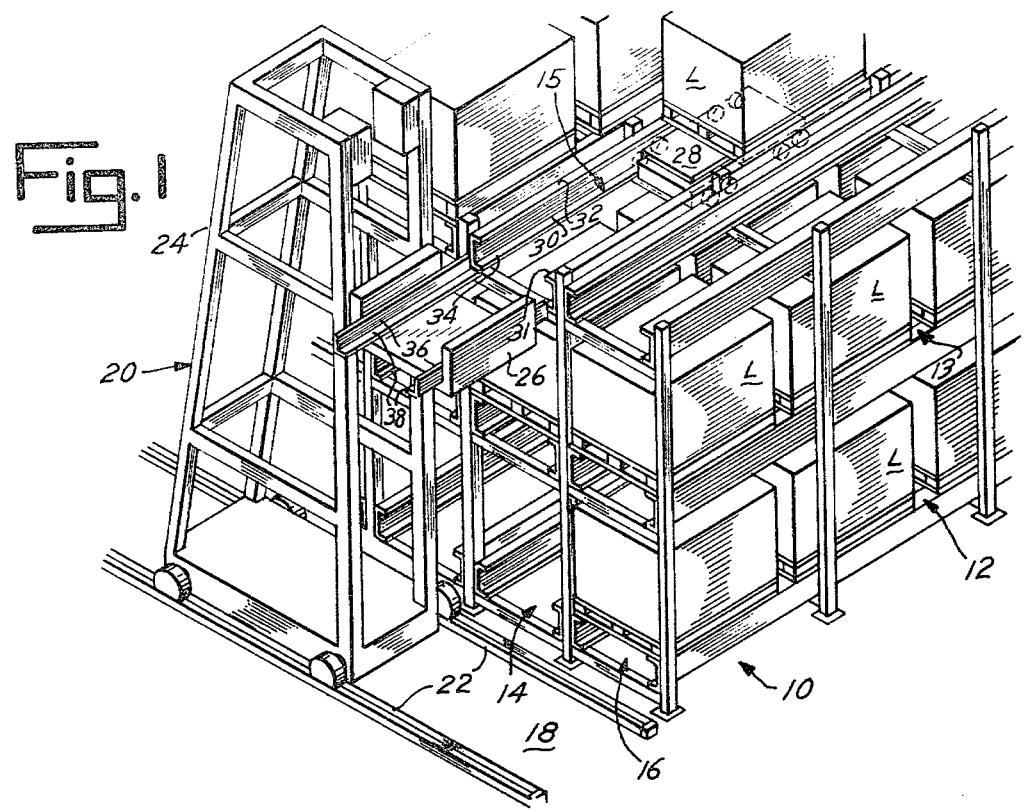
FIG. 1 is a partial perspective view of a high density warehousing system incorporating a storage and retrieval rack entry vehicle constructed in accordance with the principles of the present invention.

A transfer vehicle 20 is located in aisle 18 for operation across the open front 16 of the rack to service the respective elongate bins. The transfer vehicle 20 may either be mounted for overhead operation or for floor operation in the aisle 18. As shown in FIG. 1, the transfer vehicle 20 operates on a pair of spaced parallel floor rails 22. The transfer vehicle 20 may be operated either remotely or by an operator who rides the transfer vehicle, and may be either manually or computer controlled. The transfer vehicle 20 includes a mast structure 24 which extends the height of the bins in rack 10. An elevatable platform 26 is mounted on the mast structure 24 for movement up and down the structure and into alignment with given ones of the bins.

A rack entry vehicle 28 is movable into and out of the rack structure 10 and its bins 12–15 and onto and off the platform 26. Each of the bins as shown in FIG. 1 preferably contains at the bottom thereof a pair of spaced U-shaped channels 30, 31 extending the length of the bins. The upper horizontally extending flange 32 of each of the channels 30 and 31 defines a horizontal surface upon which a palletized load L rests when in storage in the storage rack 10. The horizontally extending lower flange 34 defines a horizontal surface upon which the rack entry vehicle 28 rolls for movement in the bin.

The lift platform 26 also preferably includes a pair of rails 36 of angled construction having a horizontal flange 38 which is adapted to define an upward facing rail surface for receipt of the rack entry vehicle upon the lift platform. This upper surface of flange 38 is alignable with the horizontal surfaces 34 of channels 30 and 31 in each of the bins.

The system thus far described is essentially conventional in rack entry vehicle high density storage systems. A description of the construction of the rack entry vehicle itself which forms the novel subject matter of the present invention will now follow.

Figure 2:
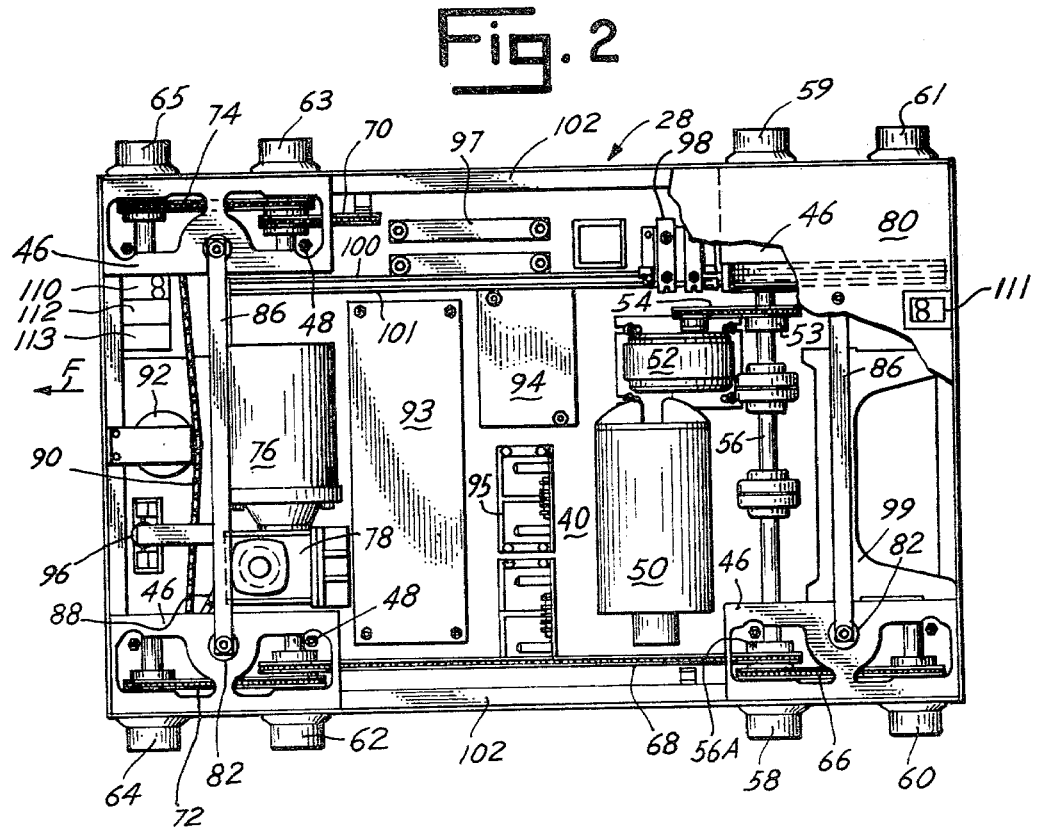
FIG. 2 is a partially broken, plan view of a storage and retrieval rack entry vehicle incorporating proximity sensors made in accordance with the principles of the present invention.
Figure 3:
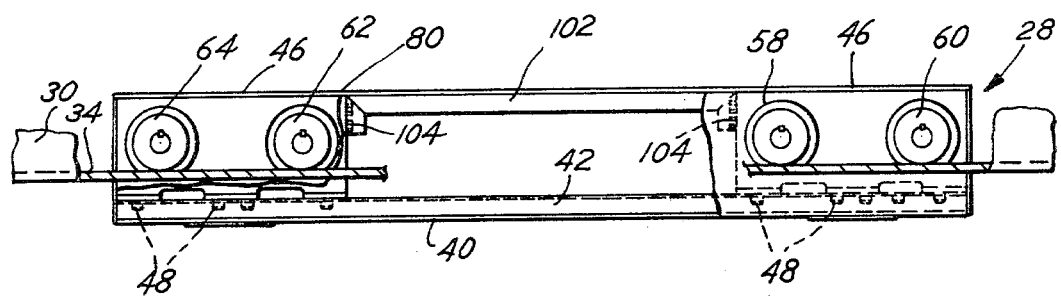
FIG. 3 is a partially broken, side elevation view of the vehicle shown in FIG. 2.
Figure 4:
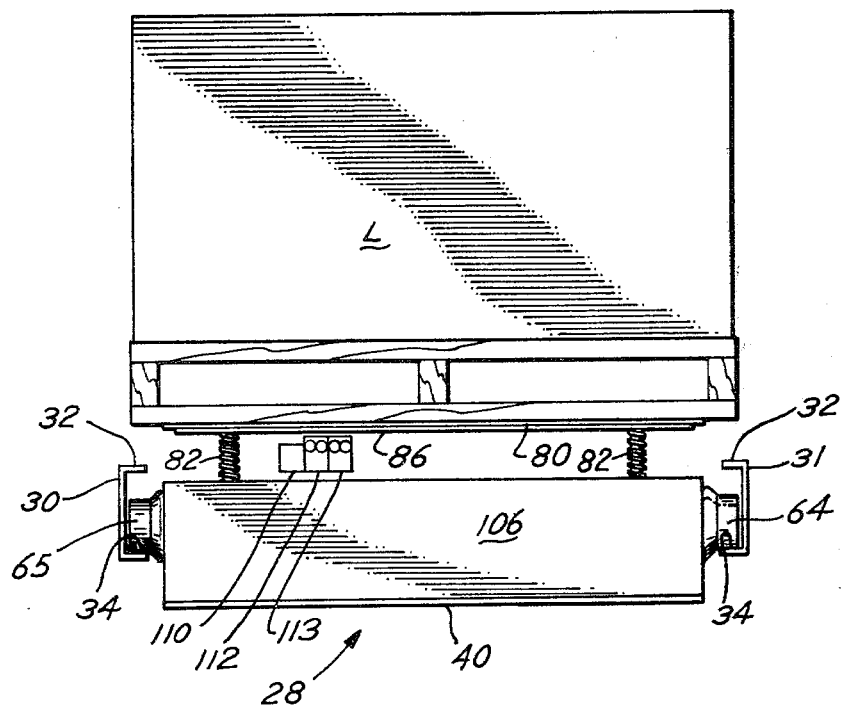
FIG. 4 is an end elevation view of the vehicle shown in FIG. 2 in which the vehicle is loaded and is in readiness for deposit of the load in the storage racks.

The rack entry vehicle 28 of the present invention is constructed in generally box form as shown in FIGS. 2–4. The box includes a rectangular, rigid, but flexible, bottom plate 40 having a length and width substantially equal to the length and width of the rack entry vehicle. The rack entry vehicle itself is substantially equal in length and width to the length and width of the loads to be handled by the vehicle. A tubular, hollow, square beam member 42 is fixed to the top of the plate 40 by suitable means, such as welding, and such that it actually becomes an integral part of the plate 40. Square beam member 42 extends about the perimeter of the plate 40 and is also substantially equal in length and width to the plate 40. The beam member 42 adds some additional rigidity to the plate 40.

A number of mounts for various component equipments are firmly fixed to either the plate 40, the beam member 42, or both, as shown in FIGS. 2 and 3. Rigid, preferably cast, lift and drive box assemblies 46 are mounted by suitable means, such as bolts 48 as shown in FIGS. 2 and 3. When mounted, the lift and drive box assemblies 46 are contained within the perimeter of the plate 40.

A vehicle drive motor 50 and its reduction gear 52 are also mounted to the plate 40 as shown in FIG. 2. A drive chain 54 extends from the reduction gear 52 to a sprocket (not shown) on a drive shaft 56. Drive shaft 56 is mounted for rotation and extends across the width of the vehicle and into two of the lift and the drive box assemblies 46 as shown in FIG. 2, where it is coupled directly to a transport means for the vehicle, e.g., a pair of vehicle drive wheels 58 and 59 on opposite sides of the vehicle. In addition, each of the lift and drive box assemblies 46 may include an additional set of wheels 60 and 61. The remaining lift and drive box assemblies 46 at the other end of the vehicle also preferably each include a pair of driven transport means, e.g., wheels 62, 63, 64, 65. These wheels are adapted to engage with and roll upon the upper surfaces of the horizontal flanges 32 of channels 30 and 31 and upper surfaces 38 of rails 36 on the platform 26.

A pair of drive sprockets (not shown) is also positioned at each end of drive shaft 56 in each of the opposite lift and drive box assemblies as shown in FIG. 2. One of these sprockets receives a drive chain 66 which extends so as to engage a sprocket on wheel 60 to drive wheel 60. Although not shown in FIG. 2, a chain corresponding to chain 66 is also provided to drive wheel 61. A pair of longer chains 68 and 70 is positioned on each of the other sprockets at each end of drive shaft 56. Chains 68 and 70 extend longitudinally down each side of the vehicle and around a driven sprocket (not shown) on wheels 62 and 63, respectively, in the other remaining lift and drive box assemblies 46 to drive wheels 62 and 63. Drive chains 72 and 74 are driven from the shafts of wheels 62 and 63, respectively, and, in turn, drive wheels 64 and 65. With the exception of drive shaft 56, none of the shafts of the remaining wheels extends across the width of the vehicle. The drive shafts of wheels 60, 61, 62, 63, 64 and 65 are preferably contained within their respective lift and drive box assemblies 46. All of the vehicle wheels 58–65 are preferably powered to assure continuing movement of the vehicle in the event that one or more of the wheels leave the rails such as when the vehicle is moving between a bin and platform 26, and also to minimize the tendency of the vehicle to turn which might result from unequal application of drive power.

A lift motor 76 and its associated reduction gear 78 are also contained on the vehicle as shown in FIG. 2 for elevation of the load carrying platform 80 of the vehicle. Four linear ball screw actuators 82 are provided, one each, in each of the lift and drive box assemblies 46 adjacent wheels 58–65. Each of the actuators 82 includes a screw gear 84 which supports the platform 80 and load L and distributes the weight of the load to a location adjacent wheels 58–65, i.e., to the rigid lift and drive box assemblies 46. The screw gear 84 is adapted to be driven into and out of the ball screw actuator 82 to raise the platform 80 to the position shown in FIG. 4 or lower the platform to cover the top of the vehicle and to rest on the tops of the several lift and drive box assemblies 46. A pair of tie bars 86 extend across the vehicle. One of the tie bars couples together the tops of the screw gears 84 at one end of the vehicle and the other tie bar couples the tops of the screw gears at the other end of the vehicle. The lift platform plate 80, in turn, rests upon the tie bars 86 and is coupled to the tops of each of the screw gears 84.

A drive chain 88 is coupled between the reduction gear 78 of the lift motor 76 and one of the ball screw actuators 82. A portion of drive chain 88 is shown in FIG. 2. A drive chain loop 90, in turn, is coupled by another sprocket (not shown) to the linear ball screw actuator to which drive chain 88 is coupled, and passes around all of the remaining linear ball screw actuators 82, as shown partially in FIG. 2. By using the loop drive chain 90, uniform and simultaneous elevation of all of the screw gears 84 is insured to avoid tilting of the platform 80 during raising and lowering. A drive chain tightener 92 may also be provided as necessary to take up any slack in the drive chain loop 90.

A number of other components may also be mounted to the plate 40 such as are necessary for the operation of the rack entry vehicle. By way of example, some of these components are shown in FIG. 2 and may include a battery 93, S and R controls 94, motor contactor controls 95, travel limit switches 96, charger pickup installations 97 for charging the battery, circuit breakers 98, and suitable signal receiving and processing components 99 for controlling the operation of the vehicles in the bins. In addition, mechanical couplings 100 and 101 may be provided which are accessible from the exterior of the vehicle for resetting the circuit breakers and brakes of the vehicle. These latter several components are mentioned by way of example only and do not specifically constitute critical elements of the invention, except to the extent that they demonstrate the competition for component space which exists in a typical rack entry vehicle.

The rack entry vehicle 28 may be controlled for positioning in the bins either from the transfer vehicle 20 by an operator or remotely by computer. Such control signals may be transmitted to the vehicle in the bin by any one of several means including an umbilical cord, conductor buses in the bin, or by electromagnetic transmissions such as radio beams. It is conceivable that the method of control may also require additional components to be present on the vehicle, such as umbilical cord reels or signal transmission and receiving components.

Referring again to FIGS. 2 and 3, an angle iron stringer member 102 preferably extends fore and aft between the tops of pairs of the lift and drive box assemblies 46 on each side of the vehicle. The stringer members 102 are attached to the respective lift and drive box assemblies 46 by suitable means, such as bolts 104 as shown in FIG. 3. The stringer members 102 further reinforce the assembly against bending about an axis parallel to the width of the vehicle. The tie bars 86 reinforce the vehicle against the bending along an axis parallel to the length of the vehicle.

The box-like construction of the vehicle is completed by a pair of end panels 106. These panels are fixed to the vehicle to prevent the entry of dirt and protect the components within the vehicle. The end plates 106 are preferably bolted to the end beams 42 and the ends of the lift and drive box assemblies 46.

Referring to FIGS. 2 and 4, the vehicle is fitted with identical sensor units 110-113. Units 110 and 111 are arranged to transmit and receive radiation along vertical axes, and units 112 and 113 are arranged to transmit and receive radiation along axes extending ahead of the vehicle. Units 110, 112 and 113 are mounted to the underside of platform 80, and, as shown in FIGS. 4 and 8, the units are raised and lowered with the platform. Each of the units is identical, and may be understood from the following description of unit 112.

Figure 5:
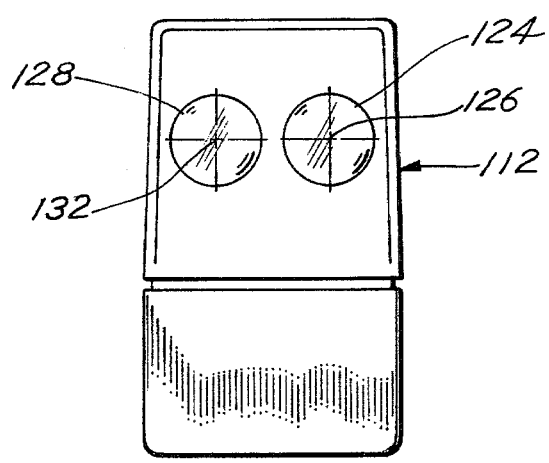
FIG. 5 is a front elevational view of a preferred form of proximity sensor shown in FIGS. 1–4.
Figure 6:
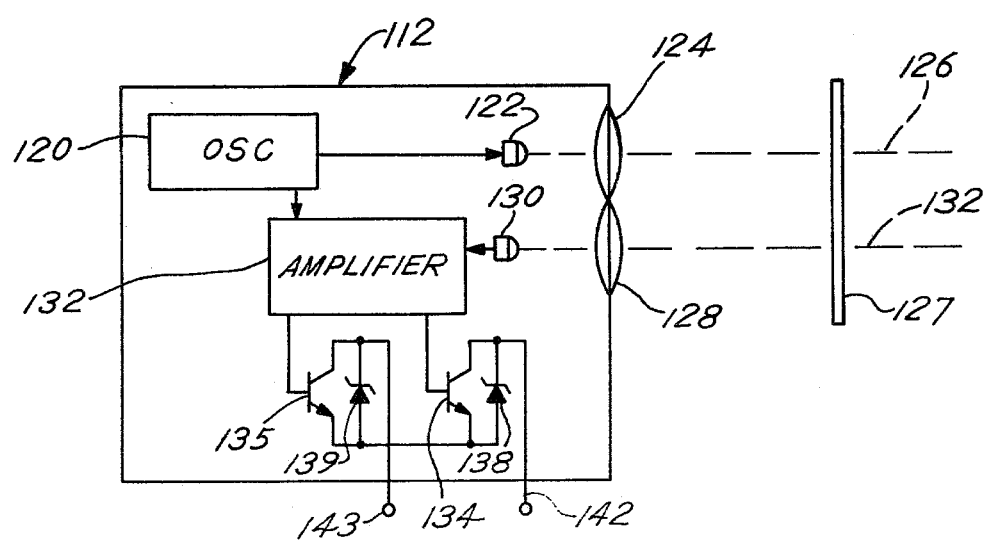
FIG. 6 is a top plan schematic drawing of the sensor shown in FIG. 5.

Referring to FIGS. 5 and 6, unit 112 comprises an oscillator 120 which modulates or pulses an infrared radiation emitting diode 122 at about 6 K Hertz. That is, diode 122 generates pulses of radiation at a repetition rate of 6 K Hertz. Radiation emitted by the diode is passed through a conventional transmitting lens 124 along an optical axis 126. The oscillator, diode and lens form a source of optical radiation.

Some of the radiation dispersed or scattered by a reflective object 127 is concentrated by a receiving lens 128 onto a phototransistor 130. Lens 128 defines an optical axis 132 which is coplanar with and parallel to axis 126. The phototransistor converts the received radiation into a corresponding electrical signal which is amplified by an amplifier 132. Oscillator 120 and amplifier 132 are synchronized by a phase-locked loop system. That is, amplifier 132 is gated by oscillator 120 so that amplifier 132 is sensitive only to radiation resulting from the operation of oscillator 120. This is an important feature which insensitizes the system to ambient radiation. Lens 128, phototransistor 130 and amplifier 132 form a detector of optical radiation. The amplifier generates output electrical signals by means of transistors 134, 135, zener diodes 138, 139, and output conductors 142, 143. When phototransistor 130 is receiving radiation at the proper repetition rate, conductor 143 is switched to a low voltage and conductor 142 is switched to a high voltage. When phototransistor 130 is not receiving radiation at the proper repetition rate, the voltage states of conductors 142, 143 are reversed. The maximum range of the unit is adjusted by varying the value of a potentiometer located within amplifier 132. This is an important feature which enables radiation received from an object to be detected at a variety of different distances within the maximum range. The maximum range also could be adjusted by varying the intensity of the transmitted radiation. Unit 112 may be implemented by a model MSC-626 system manufactured by Warner Electric Brake & Clutch Co., Beloit, Wis.

OPERATION

Referring to FIG. 7, in order to detect a load L1 carried by a pallet P, unit 112 is adjusted to function as a long range proximity detector and unit 113 is adjusted to function as a short range proximity detector. In order to achieve this result, the parallel optical axes of unit 112 are adjusted to an angle A1 of 3 degrees, and the potentiometer of unit 112 is adjusted to detect radiation from a maximum distance of about 12 feet. The parallel optical axes of unit 113 are adjusted to an angle A2 of 30 degrees, and the potentiometer in the unit is adjusted to detect radiation from a maximum distance of about 6 inches. Angles A1 and A2, of course, are achieved with platform 80 raised as shown in FIG. 4 so that units 112 and 113 are raised above flange 32.

As the vehicle moves in the direction of arrow F toward load L1 (FIG. 7), units 112, 113 move through positions P1-P3 and transmit beams of radiation LR1-LR3 and SR1-SR3, respectively. In position P1, radiation is detected by neither unit 112 nor unit 113, because neither beam LR1 nor SR1 is reflected by load L1 or pallet P. In position P2, radiation from unit 112 (beam LR2) is scattered by pallet P, and a portion of the radiation is received and detected by unit 112. The output from unit 112 can be used to sense the proximity of load L1 and to slow down the vehicle. At position P2, no radiation is detected by unit 113, because beam SR2 is not reflected by load L1 or pallet P.

As the vehicle proceeds from position P2 to position P3, radiation of the LR beam scattered by pallet P or load L1 continues to be received and detected by unit 112. This is an important feature which increases the reliability of the system. In case the system fails to detect the initial radiation scattered by the leading edge of pallet P, the system will still be able to detect radiation scattered by other portions of the pallet or the load as the vehicle moves from position P2 to position P3. It is believed that this property is achieved by use of the parallel optical axes of lenses 124, 128. As previously explained, the Loomer device is incapable of this mode of operation.

At position P3, units 112, 113 both detect radiation because beams LR3 and SR3 both are reflected. The detection of radiation by both units can be used to stop the vehicle before pallet P is touched.

Referring to FIG. 8, if the vehicle is to be positioned under load L1, the detection of radiation by both unit 112 and unit 113 is used to slow the vehicle to a crawl, and final positioning is achieved by units 110, 111. As shown in FIG. 8, units 110, 111 transmit radiation along vertical optical axes V1 and V2, respectively. Both units are adjusted to detect radiation at a maximum distance of a few inches. When units 110 and 111 both are positioned under pallet P (as shown in FIG. 8), both units receive and detect radiation scattered by the pallet. At this time, the vehicle is properly positioned under the load, and platform 80 can be raised to carry it.

To retrieve load L1 in storage rack 10, the transfer vehicle 20 will first be positioned adjacent the bin from which it is desired to retrieve the load. The lift platform 26 will also be elevated with vehicle 28 on it until the horizontal surface 38 of its rails 36 is in alignment with the horizontal surfaces 34 of the channels 30 and 31 in the bin desired, for example, bin 15 in FIG. 1.

Vehicle 28 then leaves platform 26 and proceeds until it is positioned beneath load L1 to be retrieved as shown in FIG. 8. At that time, a suitable command is transmitted to the vehicle 28 and the vehicle stops beneath the load. When stopped, the lift motor 76 is energized to elevate the platform 80 to the position shown in FIG. 4 and into contact with the bottom of the pallet upon which the load rests. Further elevation of platform 80 by ball screw actuators 82 and screw gears 84 lifts the pallet and its load free of the upper horizontal flanges 32 of channels 30 and 31 upon which it previously rested. The vehicle is then ordered to withdraw from the bin and returns to the platform 26 with the load L thereon.

If it is desired to deposit a load in the bin, the operation is simply reversed. Vehicle 28 with elevated load L (FIG. 4) leaves the lift platform 26 and rolls along surfaces 34 in the bin as shown in FIG. 7. At position P3, the vehicle is signalled to stop and platform 80 is lowered until the bottom of the load L rests upon upper horizontal flanges 32 of channels 30 and 31. The platform 80 is further lowered until it clears the bottom of the load and the empty vehicle is withdrawn from the bin back to the platform 26.

It will be understood that the embodiment of the present invention which has been described is merely illustrative of one of the applications and principles of the invention. Numerous modifications may be made by those skilled in the art without departing from the true spirit of the invention.

What is claimed is:

1. In a vehicle for transporting loads among the racks of a warehousing system, improved apparatus for detecting the proximity of objects comprising:
    source means for transmitting at least a first transmitted beam of optical radiation along a first axis;
    detector means for detecting at least a first transmitted beam of optical radiation having a second axis substantially parallel to the first axis;
    adjustment means for adjusting the maximum range at which optical radiation reflected from an object can be detected by the detector means; and
    mounting means for mounting the source means and detector means to the vehicle, whereby optical radiation scattered by an object is received by the detector means to detect the proximity of the object to the vehicle.

2. Apparatus, as claimed in claim 1, wherein the optical radiation is infrared radiation.

3. Apparatus, as claimed in claim 1, wherein the detector means is phase-locked to the source means, whereby the detector means is sensitive only to radiation transmitted by the source means.

4. Apparatus, as claimed in claim 1, wherein the source means comprises means for transmitting a second transmitted beam of optical radiation along a third axis, wherein the detector means comprises means for detecting a beam of optical radiation having a fourth axis substantially parallel to the third axis, wherein the adjustment means comprises means for adjusting the sensitivity of the detector means, and wherein the mounting means comprises means for changing the angles between the first and third axes and a horizontal plane.

5. Apparatus, as claimed in claim 4, wherein the object comprises a load carried by a pallet, said pallet having a leading edge, wherein the origin of the first axis at the source means is located above the leading edge, and wherein the first transmitted beam of optical radiation is transmitted downward at a first predetermined angle formed between the first transmitted beam and a horizontal plane.

6. Apparatus, as claimed in claim 5, wherein the second transmitted beam is transmitted downward at a second predetermined angle formed between the second transmitted beam and a horizontal plane, said second predetermined angle being greater than the first predetermined angle so that the first transmitted beam enables long range proximity detection and the second transmitted beam enables short range proximity detection.

7. Apparatus, as claimed in claim 1, wherein the source means comprises means for transmitting a first vertical beam located adjacent one end of the vehicle and a second vertical beam located adjacent the opposite end of the vehicle, and wherein the detector means comprises means for detecting the first and second vertical beams, whereby an object positioned over the vehicle can be detected.

* * * * *